US012777466B2

(12) United States Patent
Wang et al.

(10) Patent No.: US 12,777,466 B2
(45) Date of Patent: Oct. 27, 2026

(54) RESOURCE RECOMMENDATION METHOD AND TRANSPORT RESOURCE DETERMINING METHOD AND APPARATUS

(71) Applicant: VIVO MOBILE COMMUNICATION CO., LTD., Guangdong (CN)

(72) Inventors: Huan Wang, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 314 days.

(21) Appl. No.: 18/533,557

(22) Filed: Dec. 8, 2023

(65) Prior Publication Data

US 2024/0107502 A1 Mar. 28, 2024

Related U.S. Application Data

(63) Continuation of application No. PCT/CN2022/098081, filed on Jun. 10, 2022.

(30) Foreign Application Priority Data

Jun. 11, 2021 (CN) ......................... 202110655916.0

(51) Int. Cl.
*H04W 72/02* (2009.01)

(52) U.S. Cl.
CPC .................................. *H04W 72/02* (2013.01)

(58) Field of Classification Search
CPC ... H04W 72/02; H04W 72/25; H04W 72/541; H04W 92/18; H04W 24/02; H04W 76/14;
(Continued)

(56) References Cited

U.S. PATENT DOCUMENTS

2018/0376525 A1 12/2018 Feng
2020/0029340 A1* 1/2020 He ..................... H04W 72/044
(Continued)

FOREIGN PATENT DOCUMENTS

CN 108370565 A 8/2018
CN 110324859 A 10/2019
(Continued)

OTHER PUBLICATIONS

International Search Report and Written Opinion for Application No. PCT /CN2022/098081, dated Aug. 2, 2022, 8 Pages.
(Continued)

*Primary Examiner* — Will W Lin
(74) *Attorney, Agent, or Firm* — BROOKS KUSHMAN P.C.

(57) ABSTRACT

A resource recommendation method and a transport resource determining method and apparatus. The resource recommendation method includes: determining, by a first terminal, a recommended resource to be recommended to a second terminal, where the recommended resource is associated with one or more of the following: a sensing result by the first terminal; transmit resources for the first terminal; receive resources for the first terminal; and resources recommended by the first terminal to third terminals, the third terminals being terminals other than the second terminal; and/or transmitting, by the first terminal, first information to the second terminal, where the first information includes information related to the recommended resource and/or second information, the second information indicating whether the recommended resource is for transport by the second terminal to the first terminal.

15 Claims, 5 Drawing Sheets

(58) Field of Classification Search
CPC ........ H04W 4/40; H04W 4/70; H04L 5/0094; H04L 5/0053
See application file for complete search history.

(56) References Cited

U.S. PATENT DOCUMENTS

| | | | | |
|---|---|---|---|---|
| 2020/0404560 | A1 | 12/2020 | Zhang et al. | |
| 2021/0352628 | A1 | 11/2021 | Lee et al. | |
| 2021/0400639 | A1 | 12/2021 | Lee et al. | |
| 2022/0015065 | A1 | 1/2022 | Wang et al. | |
| 2022/0201557 | A1* | 6/2022 | Wang | H04W 72/0446 |
| 2022/0312397 | A1* | 9/2022 | Ryu | H04W 72/046 |
| 2022/0322359 | A1* | 10/2022 | Ye | H04W 4/40 |
| 2022/0400527 | A1* | 12/2022 | Yoon | H04W 76/14 |
| 2023/0131882 | A1* | 4/2023 | Lin | H04W 72/02 370/329 |
| 2023/0209388 | A1* | 6/2023 | Hwang | H04L 47/564 370/329 |
| 2023/0262737 | A1 | 8/2023 | Wang et al. | |
| 2023/0284241 | A1 | 9/2023 | He et al. | |
| 2023/0362934 | A1* | 11/2023 | Grieco | H04W 72/20 |
| 2024/0023145 | A1* | 1/2024 | Wang | H04L 1/1848 |
| 2024/0098764 | A1* | 3/2024 | Ashraf | H04W 76/14 |
| 2024/0276595 | A1* | 8/2024 | Blasco Serrano | H04W 76/14 |

FOREIGN PATENT DOCUMENTS

| | | | |
|---|---|---|---|
| CN | 111092673 | A | 5/2020 |
| CN | 111385765 | A | 7/2020 |
| CN | 111934835 | A | 11/2020 |
| CN | 112291743 | A | 1/2021 |
| EP | 4203550 | A1 | 6/2023 |
| WO | 2019148485 | A1 | 8/2019 |
| WO | 2019165943 | A1 | 9/2019 |
| WO | 2020060276 | A1 | 3/2020 |
| WO | 2020091494 | A1 | 5/2020 |

OTHER PUBLICATIONS

Second Chinese Office Action for Chinese Patent Application No. 202110655916.0 mailed Jul. 24, 2025. 14 pages.

Japanese Office Action for Japanese Patent Application No. 2023-575991 dated Nov. 18, 2024. 16 pages.

European Search Report for Application No. 22819639.0, Mailed Aug. 21, 2024, 13 pages.

Chinese Office Action for Chinese Patent Application No. 202110655916.0 dated Feb. 25, 2025. 16 pages.

Huawei, HiSilicon. Inter-UE coordination in sidelink resource allocation. 3GPP TSG RAN WGI Meeting #102-e. R1-2005255. Online. Aug. 2020. 9 pages.

LG Electronics. Discussion on feasibility and benefits for mode 2 enhancement. 3GPP TSG RAN WG1 Meeting #103-e. R1-2007896. Online. Oct.-Nov. 2020. 26 pages.

LG Electronics. Feature lead summary for AI 8.11.1.2 Inter-UE coordination for Mode 2 enhancements. 3GPP TSG RAN WG1 Meeting #105-e. R1-2106338. Online. May 2021. 84 pages.

* cited by examiner

RESOURCE RECOMMENDATION METHOD AND TRANSPORT RESOURCE DETERMINING METHOD AND APPARATUS

CROSS-REFERENCE TO RELATED APPLICATIONS

This application is a continuation of PCT International Application No. PCT/CN2022/098081 filed on Jun. 10, 2022, which claims priority to Chinese Patent Application No. 202110655916.0 filed on Jun. 11, 2021, which are incorporated herein by reference in their entireties.

TECHNICAL FIELD

This application pertains to the field of communication technologies, and specifically relates to a resource recommendation method and a transport resource determining method and apparatus.

BACKGROUND

Sidelink has been initially supported in long term evolution (LTE) systems for direct data transmission between terminals, applicable to specific public safety affairs, vehicle to everything (V2X) communications, and the like.

Referring to FIG. 1, in sidelink resource selection schemes, how a terminal-A11 recommends resources for a terminal-B12 and how the terminal-B12 selects transport resources are both urgent problems to be resolved.

SUMMARY

According to a first aspect, an embodiment of this application provides a resource recommendation method including:

determining, by a first terminal, a recommended resource to be recommended to a second terminal, where the recommended resource is associated with one or more of the following:

a sensing result by the first terminal;

transmit resources for the first terminal;

receive resources for the first terminal; and resources recommended by the first terminal to third terminals, the third terminals being terminals other than the second terminal;

and/or transmitting, by the first terminal, first information to the second terminal, where the first information includes information related to the recommended resource and second information, the second information indicating whether the recommended resource is for transport by the second terminal to the first terminal.

According to a second aspect, an embodiment of this application provides a transport resource determining method including:

receiving, by a second terminal, first information, where the first information includes information related to a recommended resource and/or second information, the second information indicating whether the recommended resource is for transport by the second terminal to the first terminal; and selecting, by the second terminal, a transport resource from a fourth resource and/or a fifth resource, where the fourth resource includes resources having an interference value lower than a third threshold in the recommended resource, and the fifth resource includes resources sensed by the second terminal and having an interference value lower than a fourth threshold.

According to a third aspect, an embodiment of this application provides a resource recommendation apparatus applied to a first terminal and including:

a determining module, configured to determine a recommended resource to be recommended to a second terminal, wherein the recommended resource is associated with one or more of the following:

a sensing result by the first terminal;

transmit resources for the first terminal;

receive resources for the first terminal; and resources recommended by the first terminal to third terminals, the third terminals being terminals other than the second terminal;

and/or a first transmitting module, configured to transmit first information to the second terminal, where the first information includes information related to the recommended resource and second information, the second information indicating whether the recommended resource is for transport by the second terminal to the first terminal.

According to a fourth aspect, an embodiment of this application provides a transport resource determining apparatus applied to a second terminal and including:

a second receiving module, configured to receive first information, where the first information includes information related to a recommended resource and second information, the second information indicating whether the recommended resource is for transport by the second terminal to a first terminal; and a selecting module, configured to select a transport resource from a fourth resource and/or a fifth resource, where the fourth resource includes resources having an interference value lower than a third threshold in the recommended resource, and the fifth resource includes resources sensed by the second terminal and having an interference value lower than a fourth threshold.

According to a fifth aspect, a terminal is provided, including a processor, a memory, and a program stored in the memory and capable of running on the processor, where when the program is executed by the processor, the steps of the method according to the first aspect or the second aspect are implemented.

According to a sixth aspect, a terminal is provided, including a processor and a communication interface, where the processor is configured to perform the steps of the method according to the first aspect or the second aspect.

According to a seventh aspect, a readable storage medium is provided, where the readable storage medium stores a program or instructions, and when the program or instructions are executed by a processor, the steps of the method according to the first aspect or the second aspect are implemented.

According to an eighth aspect, a computer program/program product is provided. The computer program/program product is stored in a storage medium, and the computer program/program product is executed by at least one processor to implement the steps of the method according to the first aspect or the second aspect.

According to a ninth aspect, a chip is provided, where the chip includes a processor and a communication interface, the communication interface is coupled to the processor, and the processor is configured to run a program or instructions to implement the method according to the first aspect or the second aspect.

According to a tenth aspect, a communication system is provided, where the communication system includes a first terminal and a second terminal. The first terminal is configured to implement the method according to the first aspect, and the second terminal is configured to implement the method according to the second aspect.

DETAILED DESCRIPTION

Figure 1:
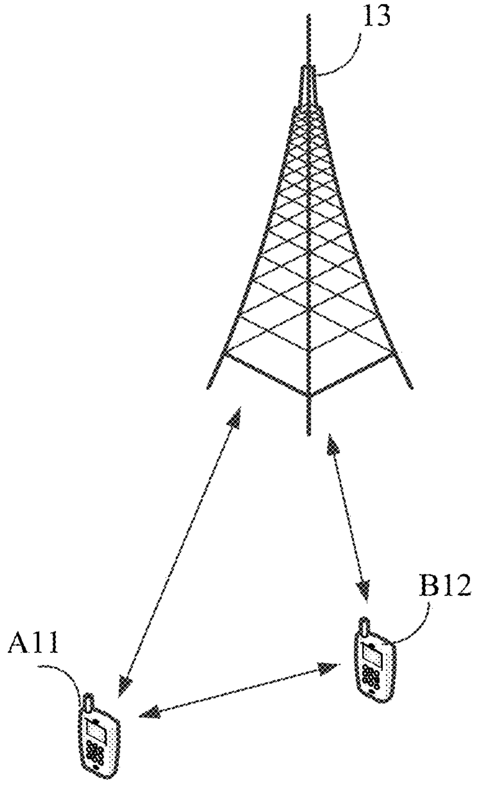
FIG. 1 is a schematic diagram of a wireless communication system to which embodiments of this application are applicable.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in an order other than the those illustrated or described herein. In addition, "first" and "second" are typically used to distinguish objects of a same type and do not limit the number of the objects. For example, there may be one or more first objects. In addition, "and" in the specification and claims represents at least one of connected objects, and the character "I" generally indicates that the contextually associated objects have an "or" relationship.

It is worth noting that the technology described in the embodiments of this application is not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

For better understanding of the embodiments of this application, the following technical points are described first.

New Radio (NR) Sidelink Resource Allocation/Selection

1. NR SL resources are allocated in two modes: one based on scheduling by base station (mode 1), and the other one based on autonomous resource selection by terminal (for example, user equipment (UE)) (mode 2). In the resource allocation mode based on scheduling by base station, sidelink resources for data transport by UE are determined by a base station, and notified to transmission (TX) UE by using downlink signaling. In the resource allocation mode based on autonomous selection by UE, UE selects available transport resources from a (pre)configured resource pool; and before the resource selection, the UE first performs channel sensing, selects a resource set with less interference based on a channel sensing result, and then randomly selects, from the resource set, a resource for transport.

In mode 2, a specific operating manner is as follows.

(1) After resource selection is triggered, TX UE first determines a resource selection window. A lower boundary of the resource selection window is at a time T1 after triggering of the resource selection, and an upper boundary of the resource selection window is at a time T2 after triggering, where T2 is a value selected within a packet delay budget (PDB) for transport of a transport block (TB) of the UE by using the UE implementation, and T2 is not earlier than T1.

(2) Before resource selection, the UE needs to determine a candidate resource set for the resource selection and perform comparison based on a reference signal received power (RSRP) measured on resources within the resource selection window and a corresponding RSRP threshold. If the RSRP is higher than the RSRP threshold, the resources are excluded and cannot be included in the candidate resource set. After resource exclusion is performed, remaining resources within the resource selection window form the candidate resource set. The resources in the candidate resource set account for no less than 20% of the resources within the resource selection window. If less than 20%, the RSRP threshold needs to be increased based on a step value (3 dB), and then the resource exclusion operation is performed until no less than 20% of the resources can be selected.

(3) After the candidate resource set is determined, the UE randomly selects transport resources from the candidate resource set. In addition, the UE may reserve transport resources for a next transport during a current transport.

2. Periodic-Based Partial Sensing

Periodic-based partial sensing is applicable to a scenario in which a resource pool enables periodic resource reservation. During resource selection, the UE needs to determine Y candidate slots (a lowest value of Y is configured/preconfigured) within the resource selection window, and each of the Y candidate slots needs to have a periodic sensing result. Assuming that $$t_y^{SL}$$

is one of the Y candidate slots, the UE is required to perform sensing in the first k periods of $$t_y^{SL}$$

to acquire a periodic sensing result. The UE needs to sense the following slots:

$$t_{y-k\times P_{reserve}}^{SL}$$

Preserve is a periodic value, Preserve is one or more configured values, and each periodic value k corresponds to one or more integer values.

3. Continuous (or Aperiodic-Based) Partial Sensing

During resource selection, before determining the candidate resource set, the UE needs to perform continuous channel sensing, and a size of a sensing window is determined based on a tracking area (TA) and a TB. During resource selection, the UE needs to consider at least one of a continuous sensing result and a periodic sensing result. In addition, a continuous partial sensing mechanism also involves a resource selection location. The resource selection window may be present after a continuous sensing window, and resource selection is performed within a selection window. Alternatively, the candidate slots are present after the continuous sensing window, and resource selection is performed on the candidate slots. It can be understood that no matter the resource selection location is named as a resource selection window or a candidate time slot, it limits a time location where resource selection can occur, without any essential difference.

Referring to FIG. 1, FIG. 1 is a block diagram of a wireless communication system to which the embodiments of this application are applicable. The wireless communication system includes a terminal A11, a terminal B12, and a network-side device 13. The terminal may also be referred to as a terminal device or user equipment (UE). The terminal may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a smart watch, a wrist band, earphones, glasses, and the like. It should be noted that the terminal A11 and the terminal B12 are not limited to a specific type in the embodiments of this application.

The network-side device 13 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission reception point (TRP), a radio access network node, or other appropriate terms in the art. Provided that the same technical effects are achieved, the base station is not limited to any specified technical term. It should be noted that in the embodiments of this application, only the base station in the NR system is used as an example, although the specific type of the base station is not limited.

Figure 2:
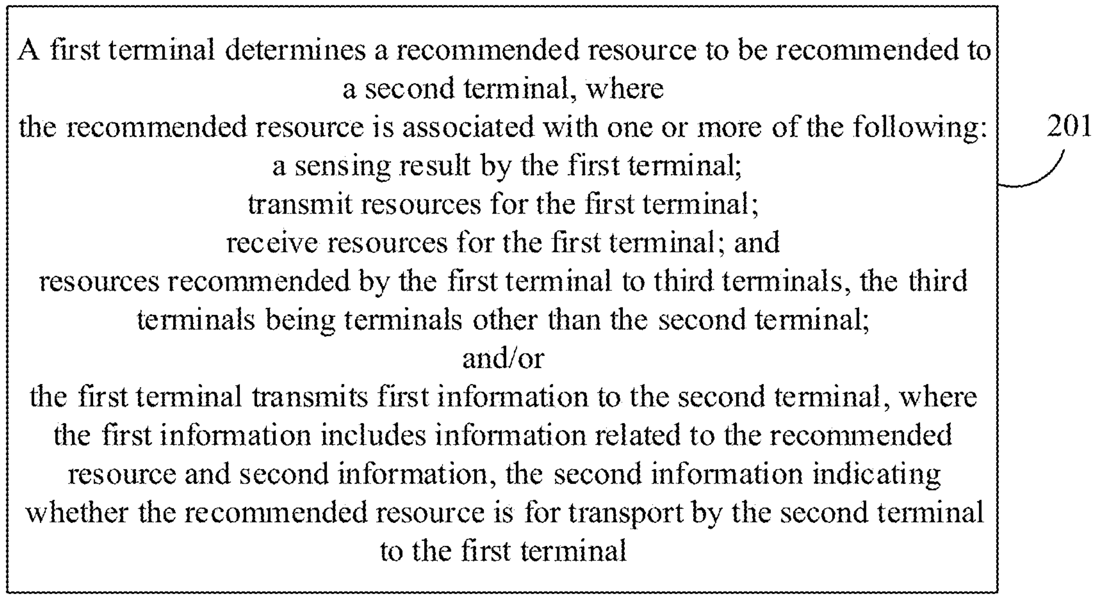
FIG. 2 is a first flowchart of a resource recommendation method according to an embodiment of this application.

Referring to FIG. 2, an embodiment of this application provides a resource recommendation method including a specific step: step 201.

Step 201. A first terminal determines a recommended resource to be recommended to a second terminal, where the recommended resource is associated with one or more of the following:

(1) a sensing result by the first terminal;

(2) transmit resources for the first terminal;

(3) receive resources for the first terminal; and (4) resources recommended by the first terminal to third terminals;

and/or the first terminal transmits first information to the second terminal, where the first information includes information related to the recommended resource and/or second information, the second information indicating whether the recommended resource is for transport by the second terminal to the first terminal.

This embodiment of this application includes the following three solutions.

Solution 1. The first terminal determines the recommended resource to be recommended to the second terminal.

Solution 2. The first terminal transmits the first information to the second terminal, where the first information includes information related to the recommended resource and/or second information, the second information indicating whether the recommended resource is for transport by the second terminal to the first terminal.

Solution 3. The first terminal determines the recommended resource to be recommended to the second terminal, and the first terminal transmits the first information to the second terminal, where the first information includes information related to the recommended resource and/or second information, the second information indicating whether the recommended resource is for transport by the second terminal to the first terminal.

It can be understood that the first terminal notifies, through the first information, the second terminal that whether the resource recommended by the first terminal is (is intended to) for transport by the second terminal to the first terminal. For example, the first information may carry a flag, for example, the flag being "1" represents that the resource recommended by the first terminal can be used for transport by the second terminal to the first terminal; and the flag being "0" represents that the resource recommended by the first terminal cannot be used for transport by the second terminal to the first terminal. Alternatively, if the first information carries an ID of the first terminal, it means that the resource recommended by the first terminal can be used for transport by the second terminal to the first terminal; and if the first information does not carry the ID of the first terminal, it means that the resource recommended by the first terminal cannot be used for transport by the second terminal to the first terminal. In this way, when the first terminal serves as receive (RX) UE, resource recommendation can be optimized in consideration of more factors, preventing the problem of resource conflicts of the first terminal.

In an embodiment of this application, the step of determining, by a first terminal, a recommended resource to be recommended to a second terminal includes: determining, by the first terminal, an application scenario; and determining, by the first terminal based on the application scenario, whether to (can) determine the recommended resource to be recommended to the second terminal.

The application scenario may include one or more of the following: a scenario in which the second terminal is incapable of sensing, a scenario in which the first terminal schedules the second terminal, a scenario in which the first terminal fully controls the recommended resource, a scenario in which the first terminal serves as a receive terminal for the second terminal, and the like.

It can be understood that whether the first terminal determines the recommended resource using a specified factor may be determined based on the application scenario for the recommended resource, thereby improving the accuracy of resource recommendation and ensuring transmission performance of the system.

In an embodiment of this application, the step of determining, by a first terminal, a recommended resource to be recommended to a second terminal includes:

determining, by the first terminal, a first resource based on the sensing result by the first terminal, the first resource having an interference value lower than a first threshold; and determining, by the first terminal, the recommended resource from the first resource.

It should be noted that the interference value herein may alternatively be construed as an energy measured value, and the recommended resource herein may alternatively be construed as a recommended resource set.

In an embodiment of this application, the method further includes:

transmitting, by the first terminal, third information to the second terminal, where the third information indicates whether the first terminal has identified the first resource when determining the recommended resource.

In an embodiment of this application, in a case that the recommended resource is associated with the sensing result by the first terminal, the first terminal determines, based on fourth information, an application scenario; and the first terminal determines, based on the application scenario, whether to determine the recommended resource based on the sensing result by the first terminal (or determine the first resource); where the fourth information represents one or more of the following:

(1) configuration or preconfiguration of a resource pool in which the resource recommended by the first terminal is located;

(2) whether the second terminal performs sensing or is capable of sensing;

(3) whether the second terminal has a sensing result satisfying a preset condition;

(4) an interference condition of the resource pool in which the resource recommended by the first terminal is located;

(5) a result of negotiation between the first terminal and the second terminal;

(6) information configured or preconfigured by a control node;

(7) information autonomously determined by the first terminal;

(8) distance between the first terminal and the second terminal; and (9) a measured value between the first terminal and the second terminal.

In an embodiment of this application, the method further includes:

receiving, by the first terminal, fifth information from the second terminal, where the fifth information indicates whether the second terminal performs sensing or is capable of sensing and/or whether the second terminal has a sensing result satisfying the preset condition.

In an embodiment of this application, the sensing result satisfying the preset condition includes one or more of the following:

(1) a complete sensing result required by a resource selection procedure acquired by the second terminal; and (2) a periodic or aperiodic-based partial sensing result corresponding to target candidate slots that the second terminal is able to acquire through a partial sensing based resource selection procedure.

In an embodiment of this application, the periodic-based partial sensing result includes: a sensing result corresponding to complete or partial periodic reservation configured for the resource pool, acquired by the second terminal through periodic-based partial sensing, or a sensing result corresponding to periodic reservation required by the resource procedure, acquired by the second terminal through periodic-based partial sensing;

or the aperiodic-based partial sensing result includes: a sensing result corresponding to complete or partial aperiodic reservation configured for the resource pool, acquired by the second terminal through aperiodic-based partial sensing, or a sensing result corresponding to aperiodic reservation required by the resource procedure, acquired by the second terminal through aperiodic-based partial sensing.

It can be understood that the foregoing required periodic reservation is configured or preconfigured by a control node, or defined by a protocol. The foregoing required aperiodic reservation is configured or preconfigured by a control node, or defined by a protocol.

In an embodiment of this application, the number of the target candidate slots is defined by a protocol, or configured or preconfigured by a control node.

In an embodiment of this application, the step of determining, by a first terminal, a recommended resource to be recommended to a second terminal includes:

determining, by the first terminal, a target resource window, the target resource window including no resource associated with the transmit resources and/or receive resources for the first terminal; acquiring, by the first terminal, a second resource within the target resource window based on the sensing result; and selecting, by the first terminal, the recommended resource from the second resource;

or determining, by the first terminal, a second resource within a preset resource window based on the sensing result; excluding, by the first terminal, resources associated with the transmit resources and/or receive resources for the first terminal from the second resource to obtain a third resource; and selecting, by the first terminal, the recommended resource from the third resource; where the second resource has an interference value lower than a second threshold.

In an embodiment of this application, the method further includes:

transmitting, by the first terminal, sixth information to the second terminal, where the sixth information indicates whether the first terminal has excluded the resources associated with the transmit resources and/or receive resources for the first terminal when selecting the recommended resource.

It can be understood that the sixth information and the first information may be the same or different information. When the sixth information and the first information are the same information, in step 201, the first terminal uses the first information to indicate whether the first terminal has excluded the resources associated with the transmit resources and/or receive resources for the first terminal when selecting the recommended resource.

In an embodiment of this application, in a case that the recommended resource is associated with the transmit resources and/or receive resources for the first terminal, the first terminal determines an application scenario based on seventh information, and the first terminal determines, based on the application scenario, whether to determine the recommended resource based on the transmit resources and/or receive resources for the first terminal, where the seventh information represents one or more of the following:

(1) a result of negotiation between the first terminal and the second terminal;

(2) information configured or preconfigured by a control node; and (3) information autonomously determined by the first terminal.

In an embodiment of this application, in a case that the recommended resource is associated with the resources recommended by the first terminal to the third terminals, the first terminal determines an application scenario based on eighth information, and the first terminal determines, based on the application scenario, whether to determine the recommended resource based on the resources recommended by the first terminal to the third terminals, where the eighth information represents a relationship between the first terminal and the second terminal. For example, the first terminal is a sidelink relay terminal (SL relay UE), a group head terminal, or a road side unit (RSU).

In the embodiments of this application, the first terminal can determine a recommended resource to be recommended to the second terminal based on various different factors, improving the accuracy of resource recommendation and ensuring transmission performance of the system. Further, the first terminal can transmit first information to the second terminal. The first information includes information related to the recommended resource and/or second information, the second information indicating whether the recommended resource is for transport by the second terminal to the first terminal. In this way, when the first terminal serves as a receive terminal, resource recommendation can be optimized in consideration of more factors, preventing the problem of resource conflicts.

Figure 3:
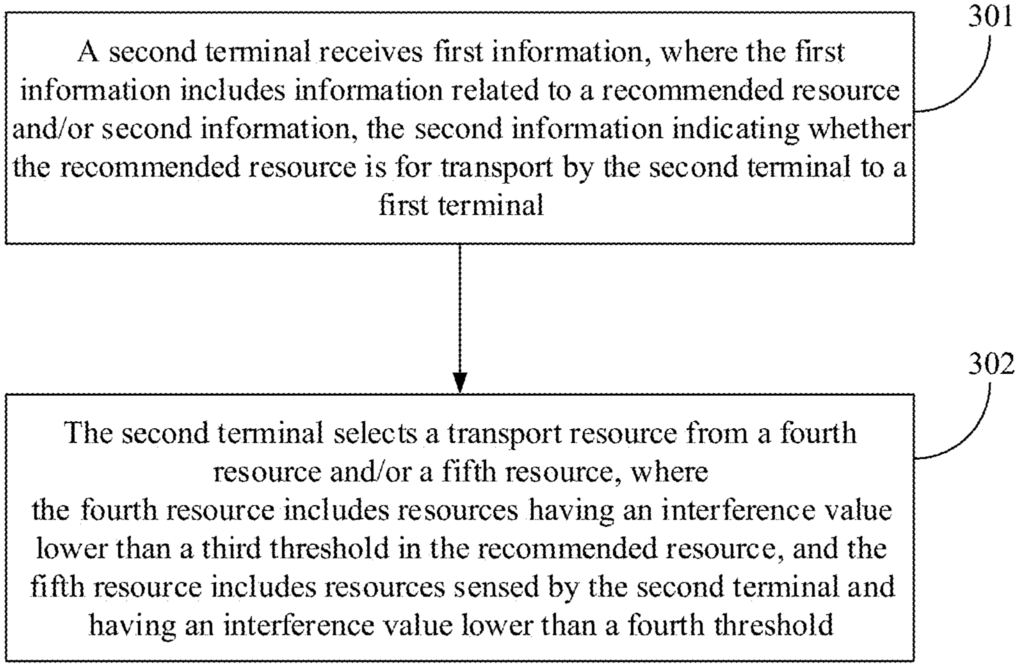
FIG. 3 is a flowchart of a transport resource determining method according to an embodiment of this application.

Referring to FIG. 3, an embodiment of this application provides a transport resource determining method including a specific step: step 301.

Step 301. A second terminal receives first information, where the first information includes information related to a recommended resource and/or second information, the second information indicating whether the recommended resource is for transport by the second terminal to a first terminal.

Step 302. The second terminal selects a transport resource from a fourth resource and/or a fifth resource, where the fourth resource includes resources having an interference value lower than a third threshold in the recommended resource, and the fifth resource includes resources sensed by the second terminal and having an interference value lower than a fourth threshold.

The fourth resource may also be referred to as a low-interference recommended resource, and the fifth resource may also be referred to as a low-interference resource sensed by the second terminal.

In an embodiment, the recommended resource mentioned in the first information may be determined by the first terminal based on one or more of the following: (1) a sensing result by the first terminal; (2) transmit resources for the first terminal; (3) receive resources for the first terminal; and (4) resources recommended by the first terminal to third terminals, the third terminals being terminals other than the second terminal.

In another embodiment, the recommended resource mentioned in the first information may alternatively be determined based on other factors than the foregoing (1) to (4). In other words, in this embodiment, factors for determining the recommended resource recommended by the first terminal are not specifically limited.

It can be understood that the second terminal can select a transport resource from a low-interference resource recommended by the first terminal or select a transport resource based on a low-interference resource sensed by the second terminal, allowing the second terminal to select appropriate transport resources in various UE collaboration scenarios.

Further, since the second information indicates whether the recommended resource is for transport by the second terminal to the first terminal, when the first terminal serves as a receive terminal, resource recommendation can be optimized in consideration of more factors, preventing the problem of resource conflicts.

In an embodiment of this application, the step of selecting, by the second terminal, a transport resource from the fourth resource includes:

determining, by the second terminal, whether the interference value of the recommended resource is lower than the third threshold; and in a case that the interference value of the recommended resource is lower than the third threshold, randomly selecting, by the second terminal, the transport resource from the resources having an interference value lower than the third threshold in the recommended resource or selecting the transport resource based on a behavior implemented by the second terminal.

In an embodiment of this application, the step of determining, by the second terminal, whether the interference value of the recommended resource is lower than the third threshold includes:

determining, by the second terminal based on a sensing result, a candidate resource set; and in a case that the recommended resource is located in the candidate resource set, determining, by the second terminal, that the interference value of the recommended resource is lower than the third threshold;

or in a case that a measured value associated with the recommended resource is lower than a fourth threshold, determining, by the second terminal, that the interference value of the recommended resource is lower than the third threshold.

Optionally, the measured value is RSRP or the like.

In an embodiment of this application, the step of determining, by the second terminal based on a sensing result, a candidate resource set includes:

determining, by a physical layer of the second terminal, a candidate resource set based on a sensing result; and if the recommended resource is located in the candidate resource set, the step of determining, by the second terminal, that the interference value of the recommended resource is lower than the third threshold includes:

if the recommended resource is located in the candidate resource set, determining, by the second terminal, that the interference value of the recommended resource is lower than the third threshold.

In an embodiment of this application, the fourth threshold is defined by a protocol or configured or preconfigured by a control node. Alternatively, the fourth threshold is determined based on the candidate resource set. Alternatively, the fourth threshold is determined based on the candidate resource set and an offset value. Alternatively, the fourth threshold is an average value of measured values on x % of the resources that have the highest/lowest measured values. Alternatively, the fourth threshold is a lowest value of thresholds obtained using various threshold determining methods.

In an embodiment of this application, the step of determining, by the second terminal based on a sensing result, a candidate resource set includes:

adjusting, by the second terminal, a threshold for the measured value on the recommended resource within a resource selection window; and determining the candidate resource set based on the sensing result and the measured value.

In an embodiment of this application, the step of acquiring, by the second terminal, the recommended resource recommended by the first terminal includes:

acquiring, by the second terminal, the recommended resource recommended by the first terminal through a medium access control (MAC) layer; and notifying, by the MAC layer of the second terminal, the recommended resource to a physical layer.

Specifically, if the recommended resource is carried by MAC CE, after the second terminal has decoded the MAC CE, the MAC layer notifies the recommended resource to the physical layer, such that the physical layer performs interference determination on the recommended resource. Alternatively, after the physical layer has reported an obtained low-interference resource set to the MAC layer, the MAC layer determines whether the recommended resource belongs to the low-interference resource set.

In an embodiment of this application, the step of selecting, by the second terminal, a transport resource from the fourth resource and fifth resource includes:

selecting, by the second terminal, M resources from the fourth resource and N resources from the fifth resource, the transport resource including the M resources and the N resources, where M and N are greater than or equal to 0.

In an embodiment of this application, the step of selecting, by the second terminal, M resources from the fourth resource and N resources from the fifth resource includes:

selecting, by the second terminal, M resources from the fourth resource first and then N resources from the fifth resource, the transport resource including the M resources and the N resources;

or selecting, by the second terminal, N resources from the fifth resource first and then M resources from the fourth resource, the transport resource including the M resources and the N resources.

In an embodiment of this application, value of M or N is defined by a protocol, configured or preconfigured by a control node, autonomously determined by the second terminal, or determined based on a sequential order according to which the second terminal selects resources from the fourth resource and fifth resource.

In an embodiment of this application, the sequential order according to which the second terminal selects resources from the fourth resource and fifth resource is defined by a protocol, or configured or preconfigured by a control node.

In an embodiment of this application, the selecting M resources or N resources includes: randomly selecting M resources from the fourth resource or randomly selecting N resources from the fifth resource.

In an embodiment of this application, the step of selecting, by the second terminal, a transport resource from the fourth resource and fifth resource includes:

combining, by the second terminal, the fourth resource and the fifth resource, and selecting a transport resource from the combined resources.

In an embodiment of this application, the step of selecting a transport resource from the combined resources includes:

selecting, by the second terminal based on a preset priority, the transport resource from the combined resources, where the preset priority includes: the second terminal takes priority to select the transport resource from the fourth resource.

In an embodiment of this application, the method further includes:

determining, by the second terminal based on ninth information, whether to select the transport resource in consideration of a sensing result by the second terminal, where the ninth information represents one or more of the following:

(1) configuration or preconfiguration of a resource pool in which the recommended resource is located;

(2) an interference condition of the resource pool in which the recommended resource is located;

(3) a result of negotiation between the first terminal and the second terminal;

(4) whether the second terminal performs sensing or is capable of sensing;

(5) whether the second terminal has sufficient sensing results;

(6) information configured or preconfigured by a control node;

(7) information autonomously determined by the second terminal;

(8) distance between the first terminal and the second terminal;

(9) a measured value between the first terminal and the second terminal; and

(10) the number of candidate resources for the second terminal.

In an embodiment of this application, the method further includes:

determining, by the second terminal based on tenth information, whether to select the transport resource in consideration of the recommended resource, where the tenth information represents the number of candidate resources for the second terminal.

For example, if the number of the candidate resources for the second terminal is less than a preset threshold, the second terminal needs to select the transport resource in consideration of the recommended resource.

In this embodiment of this application, the second terminal can select a transport resource from a low-interference resource recommended by the first terminal or select a transport resource based on a low-interference resource sensed by the second terminal, such that the transport reliability and effectiveness of the second terminal in various terminal collaboration scenarios can both be ensured.

Figure 4:
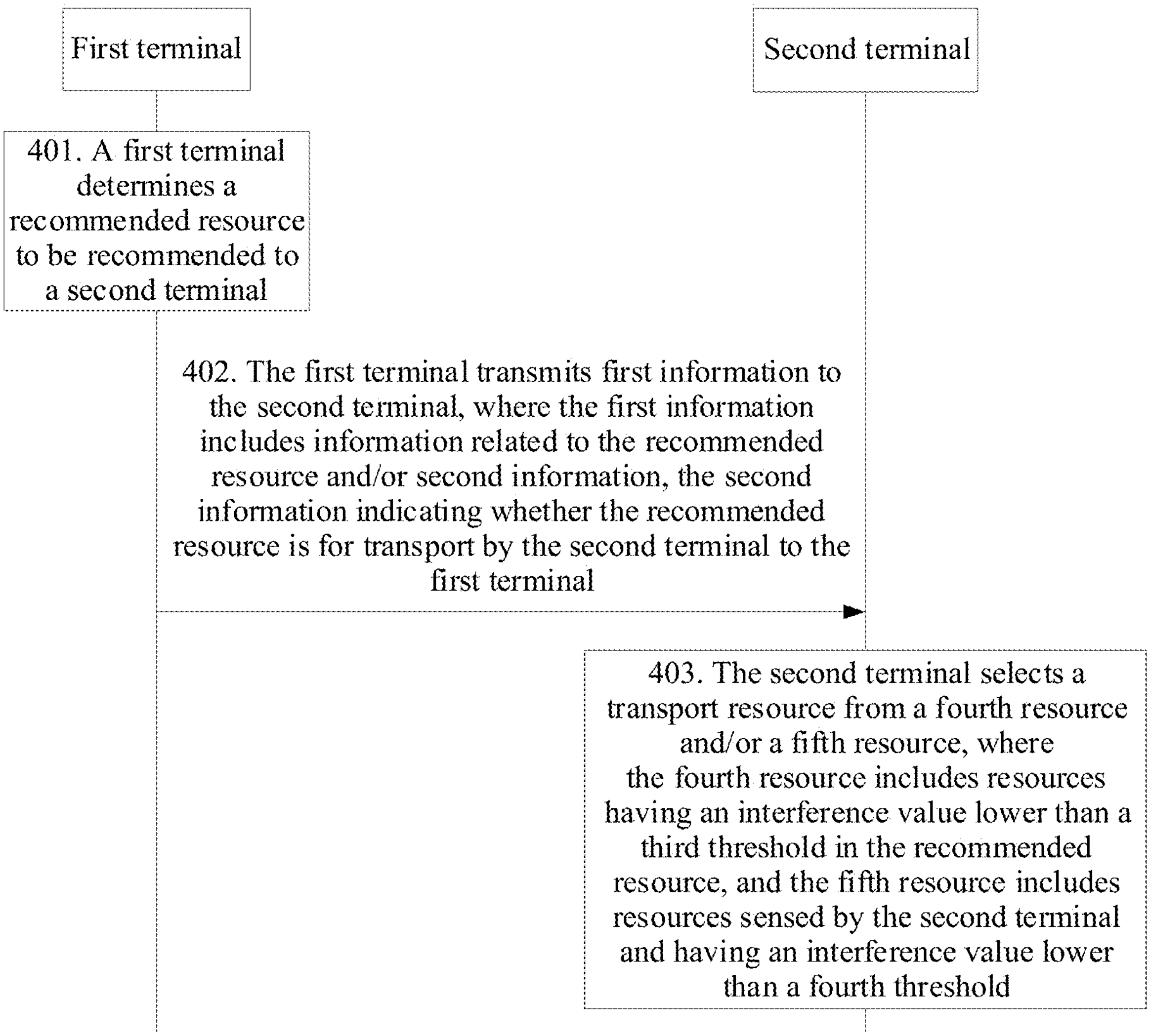
FIG. 4 is a second flowchart of a resource recommendation method according to an embodiment of this application.

Referring to FIG. 4, the following specific steps are included.

Step 401. A first terminal determines a recommended resource to be recommended to a second terminal.

Step 402. The first terminal transmits the first information to the second terminal, where the first information includes information related to the recommended resource and/or second information, the second information indicating whether the recommended resource is for transport by the second terminal to the first terminal.

Step 403. The second terminal selects a transport resource from a fourth resource and/or a fifth resource, where the fourth resource includes resources having an interference value lower than a third threshold in the recommended resource, and the fifth resource includes resources sensed by the second terminal and having an interference value lower than a fourth threshold.

It can be understood that for description of step 401 to step 403, reference may be made to the description of corresponding steps in the method embodiments shown in FIG. 2 and FIG. 3.

An example in which the first terminal is UE-A and the second terminal is UE-B is used for description below.

1. Description of how UE-A Determines a Recommended Resource

The UE-A determines a recommended resource according to one or more of the following solution 1 to solution 3.

Solution 1. The UE-A identifies a low-interference resource at least based on a sensing result and selects a recommended resource from the low-interference resource identified.

For example, the UE-A acquires, based on the sensing result, the low-interference resource within a preset resource window.

Option 1: The UE-A determines a candidate resource set based on a channel sensing result by the UE-A and determines a resource as a low-interference resource if the resource falls within the candidate resource set.

Optionally, during candidate resource set identification, the UE-A may not exclude periodic slots corresponding to slots that are not sensed by the UE-A. For example, if slot n is a slot that is not sensed by the UE-A, the UE-A does not need to exclude slot n+P, n+2*P, . . . , n+K*P during resource exclusion, where n+K*P represents a periodically reserved slot, P represents a reservation period, and K is an integer.

Option 2: If a measured RSRP value associated with a resource is less than an RSRP threshold, it is determined that the resource is a low-interference resource.

Optionally, the RSRP threshold is a value defined by a protocol, a preconfigured value, or a value configured by a control node.

Optionally, the RSRP threshold is an RSRP threshold obtained through determination based on a candidate resource set (optionally, the RSRP threshold is an RSRP threshold associated with a priority for transport of TB).

Optionally, the RSRP threshold is an average value of measured RSRP values on x % of the resources that have the highest/lowest measured RSRP values.

Optionally, whether to identify a low-interference resource based on a sensing result is determined based on one or more of the following factor 1 to factor 8.

Factor 1: Configuration or preconfiguration of a resource pool in which the recommended resource by UE-A is located.

For example, if resources of the resource pool are totally controlled by the UE-A and no other nodes bring strong interference to the resource pool, the UE-A does not need to identify the low-interference resource.

Factor 2: Whether the UE-B performs (is capable of) sensing and/or whether the UE-B has sufficient sensing results. For example, if the UE-B does not perform sensing, the UE-A may perform sensing to compensate for the lack of sensing by the UE-B; and if the UE-B performs sensing, the UE-A may not need to identify the low-interference resource.

The UE-B may report, to the UE-A, whether the UE-B performs (is capable of) sensing and/or whether the UE-B has sufficient sensing results.

Implications of the sufficient sensing results include one or more of the following:

(a) the UE can acquire, based on a sensing based resource selection procedure in the related technology, a complete sensing result required; and (b) the UE can acquire, based on a partial sensing based resource selection procedure in the related technology, a partial sensing result corresponding to target candidate slots.

Option 1: A corresponding periodic-based partial sensing and/or aperiodic-based partial sensing result meets the requirements of partial sensing in the related technology.

Option 2: Sensing results corresponding to a complete periodic reservation (or part thereof defined by a protocol/configured/preconfigured) can be acquired through periodic-based partial sensing.

Option 3: Sensing results corresponding to a complete aperiodic reservation (or part thereof defined by a protocol/configured/preconfigured), configured for the resource pool, can be acquired through aperiodic-based partial sensing.

Optionally, the number of the target candidate slots meets the requirements defined, configured, or preconfigured by a protocol.

Factor 3: An interference condition of the resource pool in which the recommended resource is located.

For example, if CBR of the resource pool is greater than a preset threshold, the UE-A does not need to identify the low-interference resource.

Factor 4: Negotiation between the UE-A and the UE-B.

For example, the UE-B requests for a transport resource from the UE-A and the resource is for transport by the UE-B to the UE-A (a transport type may be further limited as one or more of unicast, group cast, and broadcast), and the UE-A needs to identify the low-interference resource to prevent the problem of hidden nodes.

For another example, the UE-B directly instructs the UE-A to identify the low-interference resource based on a sensing result by the UE-A.

Factor 5: Preconfiguration/configuration by a control node at a control point, for example, a per-UE or per-pool configuration, for the network to control an application scenario thereof.

Factor 6: Autonomous determination of the UE-A.

Factor 7: Distance between the UE-A and the UE-B.

For example, in a case that the distance is greater than a preset value, the UE-A does not need to identify the low-interference resource and otherwise needs to identify the low-interference resource.

Factor 8: A measured RSRP value between the UE-A and the UE-B.

For example, in a case that the measured RSRP value is less than a preset value, the UE-A does not need to identify the low-interference resource and otherwise needs to identify the low-interference resource.

Optionally, whether the UE-A has identified the low-interference resource when selecting the recommended resource may be notified to the UE-B, for example, in assistance information, through independent signaling, or the like.

Solution 2: The UE-A determines the recommended resource at least based on transmission/receive resources (including transmit resources and/or receive resources) for the UE-A.

Optionally, the transmission/receive resources for the UE-A include one or more of the following:

(1) time-frequency resources received by an NR physical sidelink shared channel (Physical Sidelink Shared Channel, PSSCH);

(2) time-domain resources transmitted by the NR PSSCH;

(3) time-domain resources transmitted/received by an NR physical sidelink feedback channel (PSFCH);

(4) uplink time-domain resources transmitted by the UE-A; and (5) time-domain resources transmitted/received by an LTE PSSCH.

Optionally, association between the transmission/receive resources for the UE-A and the resource to be recommended by the UE-A is reflected in the following aspects:

(1) half-duplex limitation/simultaneous transmission limitation is present in a frequency band in which the transmission/receive resources for the UE-A and the resource to be recommended by the UE-A are located; and (2) the transmission/receive resources for the UE-A overlap a PSCCH or PSSCH resource to be recommended by the UE-A or a PSFCH resource corresponding to the PSCCH or PSSCH resource to be recommended by the UE-A.

Optionally, determining the recommended resource based on the transmission/receive resources for the UE-A includes one or more of the following.

Option 1: The UE-A acquires, based on a sensing result, a low-interference resource within a preset resource window, excludes resources associated with the transmission/receive resources for the UE-A before acquiring the low-interference resource, and then selects the recommended resource from the low-interference resource.

This can prevent conflicts between the low-interference resource and the transmission/receive resources for the UE-A and ensure sufficient selectable resources.

Option 2: The UE-A acquires, based on a sensing result, a low-interference resource within a preset resource window, excludes resources associated with the transmission/receive resources for the UE-A after acquiring the low-interference resource, and then selects the recommended resource from the low-interference resource.

In this way, the low-interference resource acquisition process can be simplified, and the UE-A selects the recommended resource more flexibly.

It can be understood that identifying the low-interference resource is an option.

Optionally, whether to determine the recommended resource based on the transmission/receive resources for the UE-A is determined based on one or more of the following factor 1 to factor 3.

Factor 1: Negotiation between the UE-A and the UE-B.

For example, the UE-B requests for a transport resource from the UE-A and the resource is for transport by the UE-B to the UE-A (a transport type may be further limited as one or more of unicast, group cast, and broadcast), and the UE-A determines the recommended resource based on the transmission/receive resources for the UE-A so as to prevent the problems of half-duplex conflict/simultaneous transmission conflict, and the like.

Factor 2: Preconfiguration/configuration by a control node at a control point, for example, a per-UE or per-pool configuration, for the network to control an application scenario.

Factor 3: UE-A implementation.

Optionally, whether the UE-A has excluded the resources associated with the transmission/receive resources for the UE-A when selecting the recommended resource may be notified to the UE-B, for example, in assistance information, through independent signaling, or the like.

Solution 3: The UE-A determines the recommended resource at least based on resources recommended by the UE-A to other UEs-B.

Optionally, whether to determine the recommended resource based on the resources recommended by the UE-A to other UEs-B is determined based on the following factor 1.

Factor 1: A relationship between the UE-A and the UE-B.

For example, if the UE-A is an SL relay UE, a group head UE, or an RSU (road side unit) and the UE-A is associated with a plurality of UEs-B, the UE-A determines the recommended resource based on the resources recommended by the UE-A to other UEs-B.

Optionally, whether the resources recommended by the UE-A are (intended to) for transport by the UE-B to the UE-A can be indicated to the UE-B, for example, using a flag, or using the UE ID of the UE-A.

In this way, as an RX UE, the UE-A can optimize resource recommendation in consideration of more factors, preventing the problem of resource conflicts of the UE-A.

2. Description of how UE-B selects a transport resource

The UE-B acquires a recommended resource and determines interference on the recommended resource based on a sensing result by the UE-B (for example, analyzes interference on the recommended resource from the perspective of TX UE), and the UE-B selects a transport resource from a low-interference recommended resource.

Optionally, the low-interference resource is determined in one or more of the following manners.

Option 1: The UE-B determines a candidate resource set based on a channel sensing result by the UE-B and determines a resource as a low-interference resource if the resource falls within the candidate resource set.

Option 2: If a measured RSRP value associated with the recommended resource is less than an RSRP threshold, it is determined that the resource is a low-interference resource.

Optionally, the RSRP threshold may be a value defined by a protocol, preconfigured, or configured by a control node.

The RSRP threshold may be an RSRP threshold obtained through determination based on the candidate resource set (for example, the RSRP threshold is an RSRP threshold associated with a priority of a transport block (TB)), or may be a threshold plus an offset value.

Optionally, the RSRP threshold is an average value of measured RSRP values on x % of the resources that have the highest/lowest measured RSRP values.

Optionally, in determining the candidate resource set in option 1 or option 2, the determination may be based on a currently available candidate resource set or an enhanced candidate resource set.

Optionally, the candidate resource set may alternatively be described as a set of low-interference resources sensed by the UE-B.

Optionally, the determination based on an enhanced candidate resource set includes: adjusting RSRP and/or RSRP threshold on the recommended resource within the resource selection window, for example, increasing/reducing the RSRP and/or RSRP threshold.

Optionally, if the recommended resource is obtained through decoding of a MAC control element (CE), the MAC layer notifies the recommended resource to the physical layer, allowing for convenient interference determination. Alternatively, the physical layer (PHY) reports a low-interference resource set obtained through sensing to the MAC layer, and the MAC layer determines whether the recommended resource belongs to the low-interference resource set.

Optionally, selecting the transport resource from the low-interference recommended resource further includes:

selecting the transport resource from the low-interference recommended resource and/or the low-interference resource sensed by the UE-B.

Option 1: Transport resources are selected from the low-interference recommended resource and the sensed low-interference resource respectively (that is, assuming that there are N transport resources, M transport resources are selected from the low-interference recommended resource, and N−M resources are selected from the sensed low-interference resource).

Optionally, the transport resources are selected from the low-interference recommended resource and the sensed low-interference resource according to a preset order, for example, from the low-interference recommended resource first. The preset order is an order configured or preconfigured by a control node.

Optionally, M is determined by UE, or M is determined based on the foregoing resource selection order.

For example, the UE takes priority to select the transport resources from the low-interference recommended resource first and then selects the transport resources from the sensed low-interference resource when there are insufficient low-interference recommended resources. Alternatively, the UE takes priority to select the transport resources from the sensed recommended resource first and then selects the transport resources from the low-interference recommended resource when there are insufficient sensed recommended resources.

For another example, the UE takes priority to select the transport resources from a combination set of the low-interference recommended resources and the sensed low-interference resources, then selects the transport resources from the remaining low-interference recommended resources if there are insufficient resources, and then selects the transport resources from the sensed low-interference resources when there are still insufficient resources.

Alternatively, the UE takes priority to select the transport resources from a combination set of the low-interference recommended resources and the sensed low-interference resources, then selects the transport resources from the sensed low-interference resources if there are insufficient resources, and then selects the transport resources from the remaining low-interference recommended resources when there are still insufficient resources.

Optionally, selection of M resources and/or N−M resources is random resource selection.

Optionally, the selected transport resources satisfy a preset relationship. For example, intervals between the resources are less than 32 slots, and hybrid automatic repeat request (HARM) round-trip time (RTT) interval is satisfied between the resources. It can be understood that the sensed low-interference resources may be the remaining sensed low-interference resources after the low-interference recommended resources are excluded.

Option 2: The low-interference recommended resource and the sensed low-interference resource are combined, and the transport resource is selected.

Optionally, the UE takes priority to select the transport resource from the low-interference recommended resource. For example, the probability of the resource selection by the UE is x % higher than that of other resources.

Optionally, a proportion of the transport resources selected from the recommended resource is defined by a protocol or configured/preconfigured by a control node.

Optionally, whether the UE-B considers its own sensing result depends on one or more of the following factor 1 to factor 8.

Factor 1: Configuration or preconfiguration of a resource pool in which the resource recommended by the UE-A is located.

For example, if resources of the resource pool are totally controlled by the UE-A and no other nodes bring strong interference to the resource pool, the UE-B does not need to perform resource selection in consideration of the sensing result by itself.

Factor 2: An interference condition of the resource pool in which the recommended resource is located.

For example, if CBR of the resource pool is greater than a preset threshold, the UE-A does not need to identify the low-interference resource.

Factor 3: Negotiation between the UE-A and the UE-B.

For example, the UE-A has not identified the low-interference resource when selecting the recommended resource, so the UE-B needs to identify the low-interference resource, so as to prevent resource collision.

Factor 4: Whether the UE-B performs (is capable of) sensing or whether the UE-B has sufficient sensing results.

For example, if the UE-B performs sensing, the UE-B needs to select the transport resource from the low-interference recommended resource in consideration of its own sensing result; otherwise, there is no such need.

Preconfiguration/configuration by a control node at a control point.

For example, configuration for each terminal (per-UE) or each resource pool (per-pool) allows a network to perform corresponding control based on an application scenario.

Factor 5: UE-B implementation.

Factor 6: Distance (or a measured RSRP value) between the UE-A and the UE-B.

For example, if the distance is greater than a preset value (or the measured RSRP value is less than a preset value), the UE-B needs to perform selection from the low-interference recommended resource in consideration of its own sensing result; otherwise, there is no such need.

A short distance means that the sensing result by the UE-A and the sensing result by the UE-B have a relatively high similarity.

Factor 7: A measured RSRP value between the UE-A and the UE-B.

For example, if the measured RSRP value is less than a preset value, the UE-B needs to perform selection from the low-interference recommended resource in consideration of its own sensing result; otherwise, there is no such need.

Factor 8: Number of candidate resources for the UE-B.

For example, if the number of the candidate resources for the UE-B is less than a preset threshold, the sensing result by the UE-B does not need to be considered.

Optionally, whether the UE-B considers the recommended resource depends on the following factor 1.

Factor 1: Number of candidate resources for the UE-B.

For example, if the number of the candidate resources for the UE-B is less than a preset threshold, the UE-B needs to select the transport resource in consideration of the recommended resource.

Figure 5:
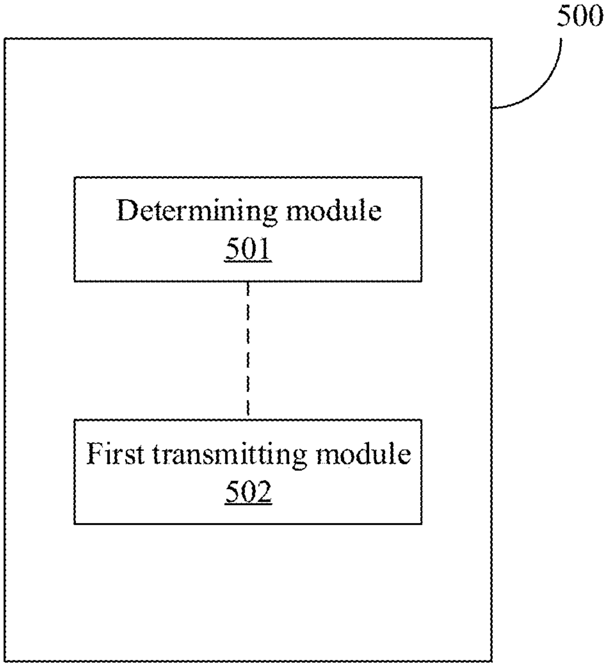
FIG. 5 is a schematic diagram of a resource recommendation apparatus according to an embodiment of this application.

Referring to FIG. 5, an embodiment of this application provides a resource recommendation apparatus applied to a first terminal. The apparatus 500 includes:

a determining module 501, configured to determine a recommended resource to be recommended to a second terminal, where the recommended resource is associated with one or more of the following:

(1) a sensing result by the first terminal;

(2) transmit resources for the first terminal;

(3) receive resources for the first terminal; and (4) resources recommended by the first terminal to third terminals, the third terminals being terminals other than the second terminal;

and/or a first transmitting module 502, configured to transmit first information to the second terminal, where the first information includes information related to the recommended resource and second information, the second information indicating whether the recommended resource is for transport by the second terminal to the first terminal.

In an embodiment of this application, the determining module 501 includes:

a first determining unit, configured to determine an application scenario; and a second determining unit, configured to determine, based on the application scenario, whether to determine the recommended resource to be recommended to the second terminal.

In an embodiment of this application, the determining module 501 is further configured to:

determine a first resource based on the sensing result by the first terminal, the first resource having an interference value lower than a first threshold; and then determine the recommended resource from the first resource.

In an embodiment of this application, the apparatus 500 further includes:

a first transmitting module, configured to transmit third information to the second terminal, where the third information indicates whether the first terminal has identified the first resource when determining the recommended resource.

In an embodiment of this application, in a case that the recommended resource is associated with the sensing result by the first terminal, the first determining unit is further configured to determine an application scenario based on fourth information; and the second determining unit is further configured to determine, based on the application scenario, whether to determine the recommended resource based on the sensing result by the first terminal; where the fourth information represents one or more of the following:

(1) configuration or preconfiguration of a resource pool in which the resource recommended by the first terminal is located;

(2) whether the second terminal performs sensing or is capable of sensing;

(3) whether the second terminal has a sensing result satisfying a preset condition;

(4) an interference condition of the resource pool in which the resource recommended by the first terminal is located;

(5) a result of negotiation between the first terminal and the second terminal;

(6) information configured or preconfigured by a control node;

(7) information autonomously determined by the first terminal;

(8) distance between the first terminal and the second terminal; and (9) a measured value between the first terminal and the second terminal.

In an embodiment of this application, the apparatus 500 further includes:

a first receiving module, configured to receive fifth information from the second terminal, where the fifth information indicates whether the second terminal performs sensing or is capable of sensing and/or whether the second terminal has a sensing result satisfying the preset condition.

In an embodiment of this application, the sensing result satisfying the preset condition includes one or more of the following:

a complete sensing result required by a resource selection procedure acquired by the second terminal; and a periodic or aperiodic-based partial sensing result corresponding to target candidate slots that the second terminal is able to acquire through a partial sensing based resource selection procedure.

In an embodiment of this application, the periodic-based partial sensing result includes: a sensing result corresponding to complete or partial periodic reservation configured for the resource pool, acquired by the second terminal through periodic-based partial sensing, or a sensing result corresponding to periodic reservation required by the resource procedure, acquired by the second terminal through periodic-based partial sensing;

or the aperiodic-based partial sensing result includes: a sensing result corresponding to complete or partial aperiodic reservation configured for the resource pool, acquired by the second terminal through aperiodic-based partial sensing, or a sensing result corresponding to aperiodic reservation required by the resource procedure, acquired by the second terminal through aperiodic-based partial sensing.

In an embodiment of this application, the number of the target candidate slots is defined by a protocol, or configured or preconfigured by a control node.

In an embodiment of this application, the determining module 501 is further configured to: determine a target resource window, the target resource window including no resource associated with the transmit resources and/or receive resources for the first terminal; acquire a second resource within the target resource window based on the sensing result; and select the recommended resource from the second resource;

or acquire a second resource within a preset resource window based on the sensing result; exclude resources associated with the transmit resources and/or receive resources for the first terminal from the second resource to obtain a third resource; and select the recommended resource from the third resource; where the second resource has an interference value lower than a second threshold.

In an embodiment of this application, the apparatus 400 further includes:

a second transmitting module, configured to transmit sixth information to the second terminal, where the sixth information indicates whether the first terminal has excluded the resources associated with the transmit resources and/or receive resources for the first terminal when selecting the recommended resource.

In an embodiment of this application, in a case that the recommended resource is associated with the transmit resources and/or receive resources for the first terminal, the first determining unit is further configured to determine an application scenario based on seventh information; and the second determining unit is further configured to determine, based on the application scenario, whether to determine the recommended resource based on the transmit resources and/or receive resources for the first terminal; where the seventh information represents one or more of the following:

(1) a result of negotiation between the first terminal and the second terminal;

(2) information configured or preconfigured by a control node; and (3) information autonomously determined by the first terminal.

In an embodiment of this application, in a case that the recommended resource is associated with the resources recommended by the first terminal to the third terminals, the first determining unit is further configured to determine an application scenario based on eighth information; and the second determining unit is further configured to determine, based on the application scenario, whether to determine the recommended resource based on the resources recommended by the first terminal to the third terminals; where the eighth information represents a relationship between the first terminal and the second terminal.

The apparatus provided in this embodiment of this application can implement the processes implemented by the method embodiment shown in FIG. 2, with the same technical effects achieved. To avoid repetition, details are not repeated herein.

Figure 6:
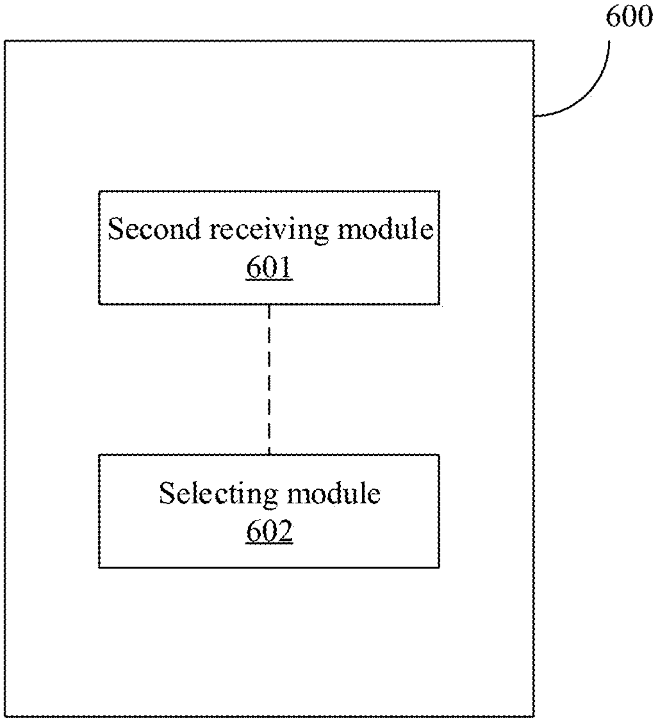
FIG. 6 is a schematic diagram of a transport resource determining apparatus according to an embodiment of this application.

Referring to FIG. 6, an embodiment of this application provides a transport resource determining apparatus applied to a second terminal. The apparatus 600 includes:

a second receiving module 601, configured to receive first information, where the first information includes information related to a recommended resource and second information, the second information indicating whether the recommended resource is for transport by the second terminal to a first terminal; and a selecting module 602, configured to select a transport resource from a fourth resource and/or a fifth resource, where the fourth resource includes resources having an interference value lower than a third threshold in the recommended resource, and the fifth resource includes resources sensed by the second terminal and having an interference value lower than a fourth threshold.

In an embodiment of this application, the selecting module 602 includes:

a determining unit, configured to determine whether the interference value of the recommended resource is lower than the third threshold; and a selecting unit, configured to randomly select the transport resource from the resources having an interference value lower than the third threshold in the recommended resource or select the transport resource based on a behavior implemented by the second terminal in a case that the interference value of the recommended resource is lower than the third threshold.

In an embodiment of this application, the determining unit is further configured to:

determine, based on a sensing result, a candidate resource set; and in a case that the recommended resource is located in the candidate resource set, determine that the interference value of the recommended resource is lower than the third threshold;

or in a case that a measured value associated with the recommended resource is lower than a fourth threshold, determine that the interference value of the recommended resource is lower than the third threshold.

In an embodiment of this application, the determining unit is further configured to: adjust a threshold for a measured value on the recommended resource within the resource selection window, and determine a candidate resource set based on the sensing result and the threshold for the measured value.

In an embodiment of this application, the selecting module 602 is further configured to select M resources from the fourth resource and N resources from the fifth resource, where M and N are greater than or equal to 0.

In an embodiment of this application, the selecting module 602 is further configured to select M resources from the fourth resource first and then select N resources from the fifth resource, the transport resource including the M resources and the N resources. Alternatively, the selecting module 602 selects N resources from the fifth resource first and then selects M resources from the fourth resource, the transport resource including the M resources and the N resources.

In an embodiment of this application, value of M or N is defined by a protocol, configured or preconfigured by a control node, autonomously determined by the second terminal, or determined based on a sequential order according to which the second terminal selects resources from the fourth resource and fifth resource.

In an embodiment of this application, the sequential order according to which the second terminal selects resources from the fourth resource and fifth resource is defined by a protocol, or configured or preconfigured by a control node.

In an embodiment of this application, the selecting M resources or N resources includes: randomly selecting M resources from the fourth resource or randomly selecting N resources from the fifth resource.

In an embodiment of this application, the selecting module 602 is further configured to combine the fourth resource and the fifth resource and select the transport resource from the combined resources.

In an embodiment of this application, the selecting module 602 is further configured to: select based on a preset priority, the transport resource from the combined resources, where the preset priority includes: the second terminal takes priority to select the transport resource from the fourth resource.

In an embodiment of this application, the apparatus 600 further includes:

a first determining module, configured to determine, based on ninth information, whether to select the transport resource in consideration of a sensing result by the second terminal, where the ninth information represents one or more of the following:

(1) configuration or preconfiguration of a resource pool in which the recommended resource is located;

(2) an interference condition of the resource pool in which the recommended resource is located;

(3) a result of negotiation between the first terminal and the second terminal;

(4) whether the second terminal performs sensing or is capable of sensing;

(5) whether the second terminal has sufficient sensing results;

(6) information configured or preconfigured by a control node;

(7) information autonomously determined by the second terminal;

(8) distance between the first terminal and the second terminal;

(9) a measured value between the first terminal and the second terminal; and

(10) the number of candidate resources for the second terminal.

In an embodiment of this application, the apparatus 600 further includes:

a second determining module, configured to determine, based on tenth information, whether to select the transport resource in consideration of the recommended resource, where the tenth information represents the number of candidate resources for the second terminal.

The apparatus provided in the embodiments of this application can implement the processes implemented by the method embodiment shown in FIG. 3, with the same technical effects achieved. To avoid repetition, details are not repeated herein.

An embodiment of this application further provides a terminal including a processor and a communication interface. The processor is configured to determine a recommended resource to be recommended to a second terminal and/or transmit first information to the second terminal. The first information includes information related to the recommended resource and second information, the second information indicating whether the recommended resource is for transport by the second terminal to the first terminal. This terminal embodiment corresponds to the foregoing method embodiment on the terminal side. All processes and implementations in the foregoing method embodiment are applicable to this terminal embodiment, with the same technical effects achieved.

Figure 7:
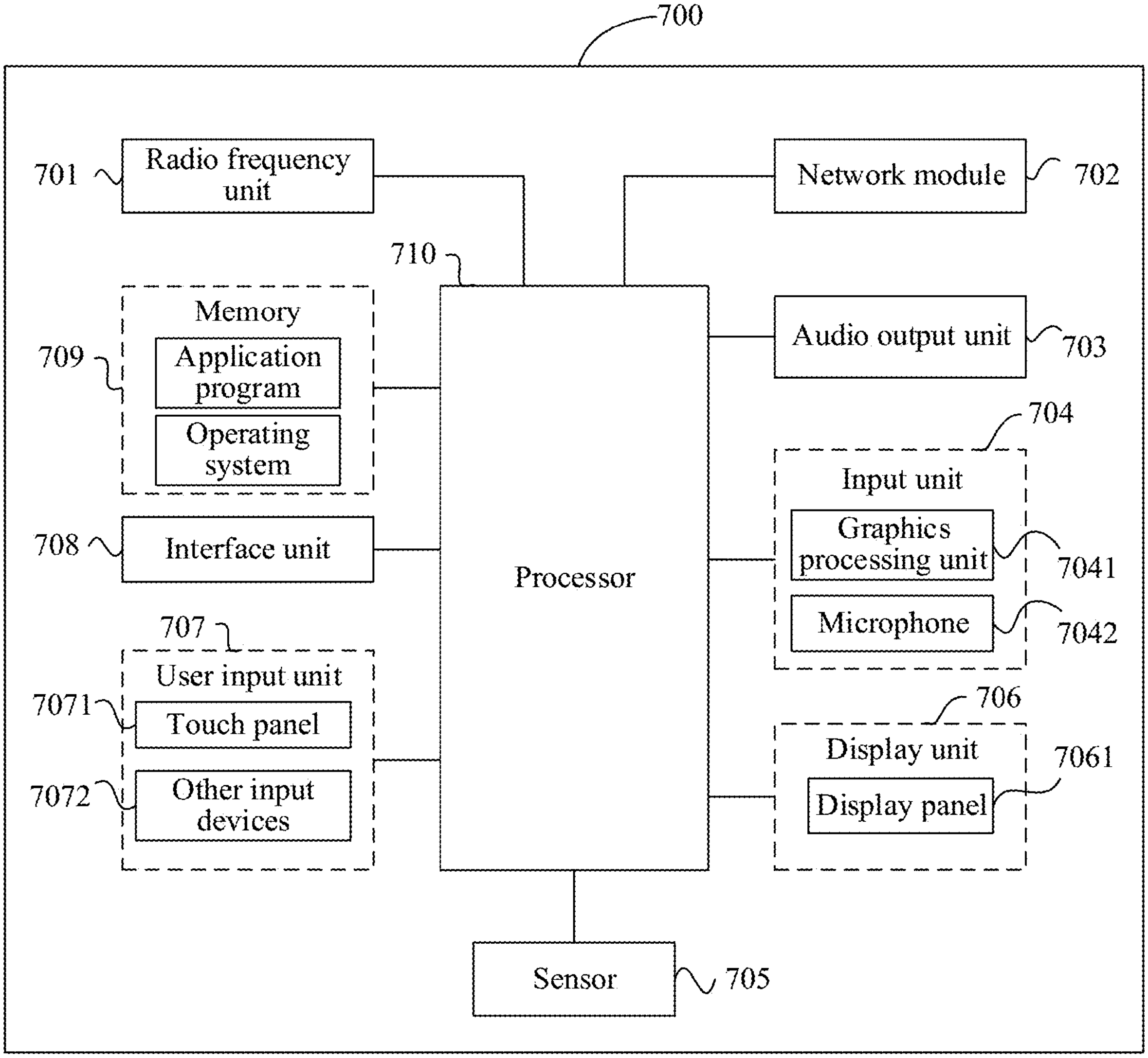
FIG. 7 is a schematic diagram of a terminal according to an embodiment of this application.

Specifically, FIG. 7 is a schematic diagram of a hardware structure of a terminal according to an embodiment of this application. The terminal 700 includes but is not limited to at least some of components such as a radio frequency unit 701, a network module 702, an audio output unit 703, an input unit 704, a sensor 705, a display unit 706, a user input unit 707, an interface unit 708, a memory 709, and a processor 710.

It can be understood by persons skilled in the art that the terminal 700 may further include a power supply (for example, a battery) supplying power to the components. The power supply may be logically connected to the processor 710 via a power management system, such that functions such as charge management, discharge management, and power consumption management are implemented using the power management system. The structure of the terminal shown in FIG. 7 does not constitute any limitation on the terminal, and the terminal may include more or fewer components than shown in the figure, or combine some of the components, or have different arrangements of the components. Details are not repeated herein.

It should be understood that in this embodiment of this application, the input unit 704 may include a graphics processing unit (GPU) 7041 and a microphone 7042. The graphics processing unit 7041 processes image data of a static picture or video obtained by an image capture apparatus (for example, a camera) in a video capture mode or an image capture mode. The display unit 706 may include a display panel 7061. The display panel 7061 may be configured in a form of a liquid crystal display, an organic light-emitting diode display, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (for example, a volume control button or a power on/off button), a trackball, a mouse, and a joystick. Details are not repeated herein.

In this embodiment of this application, the radio frequency unit 701 transmits downlink data received from a network-side device to the processor 710 for processing, and in addition, transmits uplink data to the network-side device. Generally, the radio frequency unit 701 includes but is not limited to an antenna, at least one amplifier, a transceiver, a coupler, a low noise amplifier, and a duplexer.

The memory 709 may be configured to store software programs or instructions and various data. The memory 709 may include a program or instruction storage area and a data storage area. The program or instruction storage area may store an operating system, an application program or instructions required by at least one function (for example, sound play function or image play function), and the like. In addition, the memory 709 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage devices.

The processor 710 may include one or more processing units. Optionally, the processor 710 may integrate an application processor and a modem processor. The application processor mainly processes an operating system, a user interface, application programs or instructions, and the like. The modem processor, for example, a baseband processor, mainly processes wireless communication. It can be understood that the modem processor may alternatively be not integrated in the processor 710.

The terminal provided in this embodiment of this application can implement the processes implemented in the method embodiments shown in FIG. 2 or FIG. 3, with the same technical effects achieved. To avoid repetition, details are not repeated herein.

An embodiment of this application further provides a computer program/program product, where the computer program/program product is stored in a non-volatile storage medium, and the computer program/program product is executed by at least one processor to implement the steps of the processing method in FIG. 2 or FIG. 3.

An embodiment of this application further provides a readable storage medium, where the readable storage medium stores a program or instructions, and when the program or instructions are executed by a processor, the processes of the method embodiments shown in FIG. 2 or FIG. 3 are implemented, with the same technical effects achieved. To avoid repetition, details are not repeated herein.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the method embodiments shown in FIG. 3, with the same technical effects achieved. To avoid repetition, details are not repeated herein.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from principles of this application and the protection scope of the claims, and all such forms fall within the protection scope of this application.

What is claimed is:

1. A resource recommendation method, comprising:

transmitting, by a first terminal, first information to a second terminal, wherein the first information comprises information related to a recommended resource and second information, the second information indicating whether the recommended resource is intended for transport by the second terminal to the first terminal;

wherein the first information is used by the second terminal to select a transport resource from a fourth resource and a fifth resource, the fourth resource comprises resources located in a candidate resource set determined by the second terminal based on a sensing result in the recommended resource, and the fifth resource comprises resources sensed by the second terminal and having a measured reference signal received power (RSRP) value lower than a fourth threshold;

when the second terminal select the transport resource from the fourth resource and the fifth resource, the second terminal selects M resources from the fourth resource first and then selects N resources from the fifth resource, where M and N are greater than or equal to 0.

2. The method according to claim 1, wherein the method further comprises:

determining, by the first terminal, the recommended resource to be recommended to the second terminal, wherein the recommended resource is associated with one or more of the following:

a sensing result by the first terminal;

transmit resources for the first terminal;

receive resources for the first terminal; and resources recommended by the first terminal to third terminals, the third terminals being terminals other than the second terminal;

wherein the step of determining, by the first terminal, the recommended resource to be recommended to the second terminal comprises:

determining, by the first terminal, an application scenario; and determining, by the first terminal based on the application scenario, whether to determine the recommended resource to be recommended to the second terminal.

3. The method according to claim 2, wherein the step of determining, by the first terminal, an application scenario comprises:

determining, by the first terminal, an application scenario based on fourth information; and the step of determining, by the first terminal based on the application scenario, whether to determine the recommended resource to be recommended to the second terminal comprises:

determining, by the first terminal based on the application scenario, whether to determine the recommended resource based on the sensing result by the first terminal; wherein the fourth information represents one or more of the following:

configuration or preconfiguration of a resource pool in which the resource recommended by the first terminal is located;

whether the second terminal performs sensing or is capable of sensing;

whether the second terminal has a sensing result satisfying a preset condition;

an interference condition of the resource pool in which the resource recommended by the first terminal is located;

a result of negotiation between the first terminal and the second terminal;

information configured or preconfigured by a control node;

information autonomously determined by the first terminal;

distance between the first terminal and the second terminal; and a measured value between the first terminal and the second terminal.

4. The method according to claim 3, wherein the method further comprises:

receiving, by the first terminal, fifth information from the second terminal, wherein the fifth information indicates whether the second terminal performs sensing or is capable of sensing and/or whether the second terminal has a sensing result satisfying the preset condition.

5. The method according to claim 3, wherein the sensing result satisfying the preset condition comprises one or more of the following:

a complete sensing result required by a resource selection procedure acquired by the second terminal; and a periodic or aperiodic-based partial sensing result corresponding to target candidate slots that the second terminal is able to acquire through a partial sensing based resource selection procedure, wherein the periodic-based partial sensing result comprises: a sensing result corresponding to complete or partial periodic reservation configured for the resource pool, acquired by the second terminal through periodic-based partial sensing, or a sensing result corresponding to periodic reservation required by the resource selection procedure, acquired by the second terminal through periodic-based partial sensing;

or the aperiodic-based partial sensing result comprises: a sensing result corresponding to complete or partial aperiodic reservation configured for the resource pool, acquired by the second terminal through aperiodic-based partial sensing, or a sensing result corresponding to aperiodic reservation required by the resource procedure, acquired by the second terminal through aperiodic-based partial sensing, wherein the number of the target candidate slots is defined by a protocol, or configured or preconfigured by a control node.

6. The method according to claim 2, wherein the step of determining, by the first terminal, an application scenario comprises:

determining, by the first terminal, an application scenario based on seventh information; and the step of determining, by the first terminal based on the application scenario, whether to determine the recommended resource to be recommended to the second terminal comprises:

determining, by the first terminal based on the application scenario, whether to determine the recommended resource based on the transmit resources and/or receive resources for the first terminal; wherein the seventh information represents one or more of the following:

a result of negotiation between the first terminal and the second terminal;

information configured or preconfigured by a control node; and information autonomously determined by the first terminal; or, wherein the step of determining, by the first terminal, an application scenario comprises:

determining, by the first terminal, an application scenario based on eighth information; and the step of determining, by the first terminal based on the application scenario, whether to determine the recommended resource to be recommended to the second terminal comprises:

determining, by the first terminal based on the application scenario, whether to determine the recommended resource based on the resources recommended by the first terminal to the third terminals; wherein the eighth information represents a relationship between the first terminal and the second terminal.

7. The method according to claim 1, wherein the method further comprises:

determining, by the first terminal, the recommended resource to be recommended to the second terminal, wherein the recommended resource is associated with one or more of the following:

a sensing result by the first terminal;

transmit resources for the first terminal;

receive resources for the first terminal; and resources recommended by the first terminal to third terminals, the third terminals being terminals other than the second terminal;

wherein the step of determining, by the first terminal, the recommended resource to be recommended to the second terminal comprises:

determining, by the first terminal, a first resource based on the sensing result by the first terminal, the first resource having an interference value lower than a first threshold; and determining, by the first terminal, the recommended resource from the first resource, wherein the method further comprises:

transmitting, by the first terminal, third information to the second terminal, wherein the third information indicates whether the first terminal has identified the first resource when determining the recommended resource.

8. The method according to claim 1, wherein the method further comprises:

determining, by the first terminal, the recommended resource to be recommended to the second terminal, wherein the recommended resource is associated with one or more of the following:

a sensing result by the first terminal;

transmit resources for the first terminal;

receive resources for the first terminal; and resources recommended by the first terminal to third terminals, the third terminals being terminals other than the second terminal;

wherein the step of determining, by the first terminal, the recommended resource to be recommended to the second terminal comprises:

determining, by the first terminal, a target resource window, the target resource window comprising no resource associated with the transmit resources and/or receive resources for the first terminal; acquiring, by the first terminal, a second resource within the target resource window based on the sensing result; and selecting, by the first terminal, the recommended resource from the second resource;

or acquiring, by the first terminal, a second resource within a preset resource window based on the sensing result; excluding, by the first terminal, resources associated with the transmit resources and/or receive resources for the first terminal from the second resource to obtain a third resource; and selecting, by the first terminal, the recommended resource from the third resource; wherein the second resource has an interference value lower than a second threshold.

9. The method according to claim 1, wherein the method further comprises:

transmitting, by the first terminal, sixth information to the second terminal, wherein the sixth information indicates whether the first terminal has excluded the resources associated with the transmit resources and/or receive resources for the first terminal when selecting the recommended resource.

10. A transport resource determining method, comprising:

receiving, by a second terminal, first information, wherein the first information comprises information related to a recommended resource and second information, the second information indicating whether the recommended resource is intended for transport by the second terminal to the first terminal; and selecting, by the second terminal, a transport resource from a fourth resource and a fifth resource, wherein the fourth resource comprises resources located in a candidate resource set determined by the second terminal based on a sensing result in the recommended resource, and the fifth resource comprises resources sensed by the second terminal and having a measured reference signal received power (RSRP) value lower than a fourth threshold;

wherein the step of selecting, by the second terminal, a transport resource from a fourth resource and a fifth resource comprises:

selecting, by the second terminal, M resources from the fourth resource first and then N resources from the fifth resource, wherein M and N are greater than or equal to 0.

11. The method according to claim 10, wherein value of M or N is defined by a protocol, configured or preconfigured by a control node, autonomously determined by the second terminal, or determined based on a sequential order according to which the second terminal selects resources from the fourth resource and fifth resource.

12. The method according to claim 10, wherein the sequential order according to which the second terminal selects resources from the fourth resource and fifth resource is defined by a protocol, or configured or preconfigured by a control node; or, wherein the selecting M resources or N resources comprises: randomly selecting M resources from the fourth resource or randomly selecting N resources from the fifth resource.

13. The method according to claim 10, wherein the step of selecting, by the second terminal, a transport resource from the fourth resource and fifth resource comprises:

combining, by the second terminal, the fourth resource and the fifth resource, and selecting a transport resource from the combined resources, wherein the step of selecting a transport resource from the combined resources comprises:

selecting, by the second terminal based on a preset priority, the transport resource from the combined resources, wherein the preset priority comprises: the second terminal takes priority to select the transport resource from the fourth resource.

14. The method according to claim 10, wherein the method further comprises:

determining, by the second terminal based on ninth information, whether to select the transport resource in consideration of a sensing result by the second terminal, wherein the ninth information represents one or more of the following:

configuration or preconfiguration of a resource pool in which the recommended resource is located;

an interference condition of the resource pool in which the recommended resource is located;

a result of negotiation between the first terminal and the second terminal;

whether the second terminal performs sensing or is capable of sensing;

whether the second terminal has sufficient sensing results;

information configured or preconfigured by a control node;

information autonomously determined by the second terminal;

distance between the first terminal and the second terminal;

a measured value between the first terminal and the second terminal; and a number of the second terminal's candidate resources; or, wherein the method further comprises:

determining, by the second terminal based on tenth information, whether to select the transport resource in consideration of the recommended resource, wherein the tenth information represents the number of the second terminal's candidate resources.

15. A terminal, comprising: a processor, a memory, and a program stored in the memory and capable of running on the processor, wherein the program, when executed by the processor, causes the terminal to perform:

transmitting first information to a second terminal, wherein the first information comprises information related to a recommended resource and second information, the second information indicating whether the recommended resource is intended for transport by the second terminal to a first terminal;

wherein the first information is used by the second terminal to select a transport resource from a fourth resource and a fifth resource, the fourth resource comprises resources located in a candidate resource set determined by the second terminal based on a sensing result in the recommended resource, and the fifth resource comprises resources sensed by the second terminal and having a measured reference signal received power (RSRP) value lower than a fourth threshold;

when the second terminal select the transport resource from the fourth resource and the fifth resource, the second terminal selects M resources from the fourth resource first and then selects N resources from the fifth resource, where M and N are greater than or equal to 0.

* * * * *